(No Model.)

J. LUNDERGAN.
POTATO DIGGER.

No. 372,757. Patented Nov. 8, 1887.

Witnesses,
Chas. S. Edgerton
Matthew Bender Jr.

Inventor,
John Lundergan
by Robert W. Hardie his atty.

UNITED STATES PATENT OFFICE.

JOHN LUNDERGAN, OF WATERVLIET, NEW YORK.

POTATO-DIGGER.

SPECIFICATION forming part of Letters Patent No. 372,757, dated November 8, 1887.

Application filed June 27, 1887. Serial No. 242,698. (No model.)

*To all whom it may concern:*

Be it known that I, JOHN LUNDERGAN, of the town of Watervliet, in the county of Albany and State of New York, have invented certain new and useful Improvements in Potato-Diggers, of which the following is a specification.

The object of my invention is to provide means adapted to remove potatoes from under the ground and to leave them exposed to view without cutting or scraping them.

Figure 4:
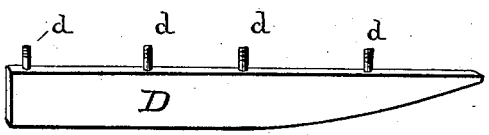
Figure 2:
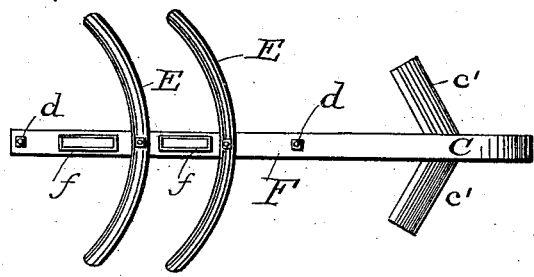
Figure 3:
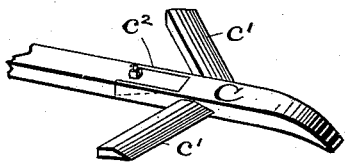
Figure 1:
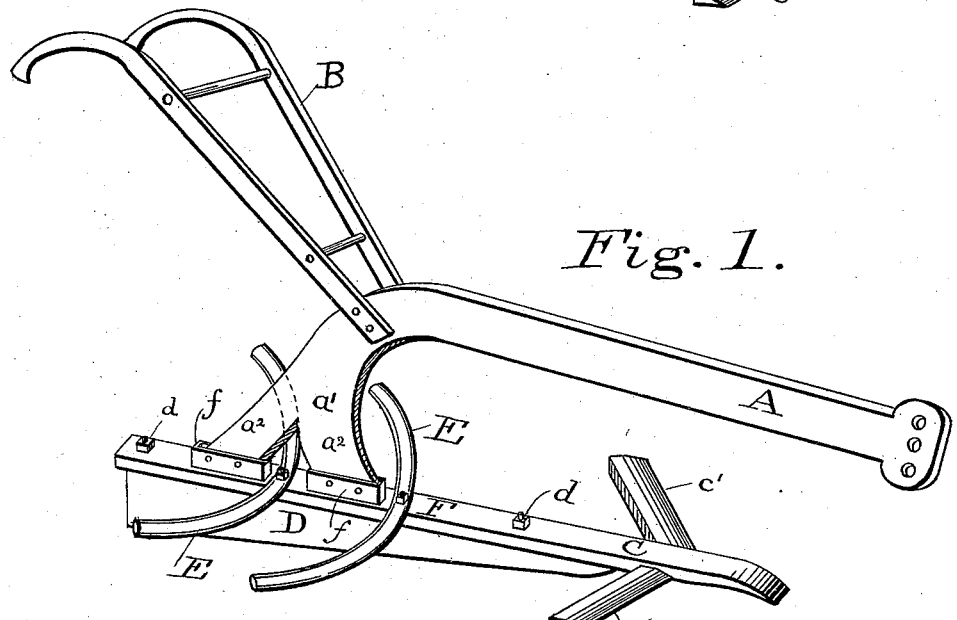

In the drawings, Figure 1 is a perspective view of a complete digger provided with my improvements. Fig. 2 is a plan view showing particularly the construction of the share and the leveling-arms. Fig. 3 is a perspective view showing a modification of the manner of attaching the share to the ground-bar. Fig. 4 is a view of the keel in perspective, showing it detached from the ground-bar.

In the organization of the digger shown in the drawings a draft-beam, A, is connected to a ground-bar or runner, F, by the standard $a'$. This ground-bar is provided on its upper surface with flanges $f$, so as to form a recess or socket adapted to surround the foot $a^2$ of the standard $a'$. The feet of the standard are secured in their position by means of bolts and nuts, or other devices having similar capabilities, passing through the feet and flanges. Handles B are connected with the draft-beam, substantially in the manner shown in the drawings.

In the construction shown the extreme fore end of the ground-bar forms the projecting point of the share. This projecting point or finger C is beveled at the end, and dips downward slightly, and is so constructed to enable the point to feed into the ground and to plow under any stone or other obstacle it may meet in its path.

What I designate as the "share" consists, in addition to the projecting point C, of wings or cutters $c'$, extending out from the bar, to which they are attached in a plane substantially horizontal. These cutters slope backward from the point of their attachment to the bar, and have their front edge sharpened to enable them to cut the ground freely.

Instead of the construction shown in Fig. 1, wherein the projecting point of the share forms an integral part of the ground-bar, the share, which consists, as before mentioned, of the projecting point and side cutters, may be made separate and attached to the bar, as shown in Fig. 3, wherein the end of the ground-bar is beveled, as indicated by the dotted lines, and connected with the correspondingly-beveled rear end of the share, and rests in a socket formed by the extension backward of the sides $c^2$ of the back end of the share. To the under surface of the ground-bar is attached a keel, D, of thin metal, beveled in front and provided with studs $d$, which project through holes in the ground-bar, and are screwed to the bar by nuts screwed onto the studs on the upper surface of the bar. To the bar on the upper surface are attached arms E, extending outward from the bar and backward from their point of attachment to the same in a substantially horizontal plane. These arms may be made of metal, flat on the top and bottom, and having a rounding front edge that will not cut or mar the potatoes. These leveling-arms are arranged in a plane slightly above that of the cutting-wings.

The share being substantially flat, the earth is first loosened by the projecting point C and cutting-arms $c'$, and the earth and potatoes are lifted vertically from their place in the hill, whereas were the share curved on its upper surface it would have a tendency to shove the potatoes and earth sidewise, thereby forming a new mound or ridge in its course. After the earth is thus loosened and raised slightly, the branching arms E pass under the earth and potatoes and sweep the dirt composing the hill out into a substantially level surface, thereby leaving the potatoes exposed above the ground. The keel D sinks into the earth and keeps the digger in its course and prevents lateral deflection.

What I claim as new, and desire to secure by Letters Patent, is—

In a potato-digger, the combination, with the ground-bar F, having a projecting point, C, and cutting-wings $c'$, sharpened on their fore edge, extending obliquely from the ground-bar in a horizontal plane, of a keel, D, consisting of a narrow blade of metal curved or inclined to a point at its front end, and leveling-arms E, curved backward from the point of their attachment to the ground-bar and arranged in a horizontal plane slightly above that of the cutting-wings, substantially as shown and described.

JOHN LUNDERGAN.

Witnesses:
ROBERT W. HARDIE,
JAMES M. RUST.